United States Patent [19]

Hart

[11] Patent Number: 4,974,911
[45] Date of Patent: Dec. 4, 1990

[54] VENT VALVE DEVICE

[75] Inventor: James E. Hart, Trafford, Pa.

[73] Assignee: American Standard Inc., Wilmerding, Pa.

[21] Appl. No.: 378,358

[22] Filed: Jul. 11, 1989

[51] Int. Cl.$^5$ .............................................. B60T 15/44
[52] U.S. Cl. ...................................... 303/82; 303/86; 303/57
[58] Field of Search ...................... 303/82, 86, 33–38, 303/40, 39, 57, 42, 66, 68, 69, 81, 83

[56] References Cited

U.S. PATENT DOCUMENTS

| | | | |
|---|---|---|---|
| 3,165,115 | 1/1965 | Erson | 303/82 X |
| 4,025,126 | 5/1977 | Wilson | 303/33 |
| 4,026,609 | 5/1977 | Bridigum | 303/82 |
| 4,043,604 | 8/1977 | Hart | 303/33 |

Primary Examiner—Douglas C. Butler
Attorney, Agent, or Firm—G. J. Falce

[57] ABSTRACT

A vent valve device having a pair of diaphragm-type piston members forming a pilot chamber therebetween. The one piston controls a vent valve via which brake pipe pressure is vented locally, while the other piston controls a pilot valve a control venting of the pilot chamber. A breather choke between the pilot chamber on one side of the other piston and a control chamber on the opposite side establishes a predetermined pressure differential thereacross only when brake pipe pressure supplied to the pilot chamber is reduced at an emergency rate to thereby actuate the other piston to a position opening the pilot valve. In addition, this other piston operates a cut-off valve to isolate the pilot chamber from brake pipe pressure so that the pilot valve quickly exhausts pilot chamber pressure. The one piston controlling the vent valve is in turn actuated by the exhaust of pilot chamber pressure to positively effect an unrestricted, local reduction of brake pipe pressure via the vent valve when this one piston is actuated.

14 Claims, 1 Drawing Sheet

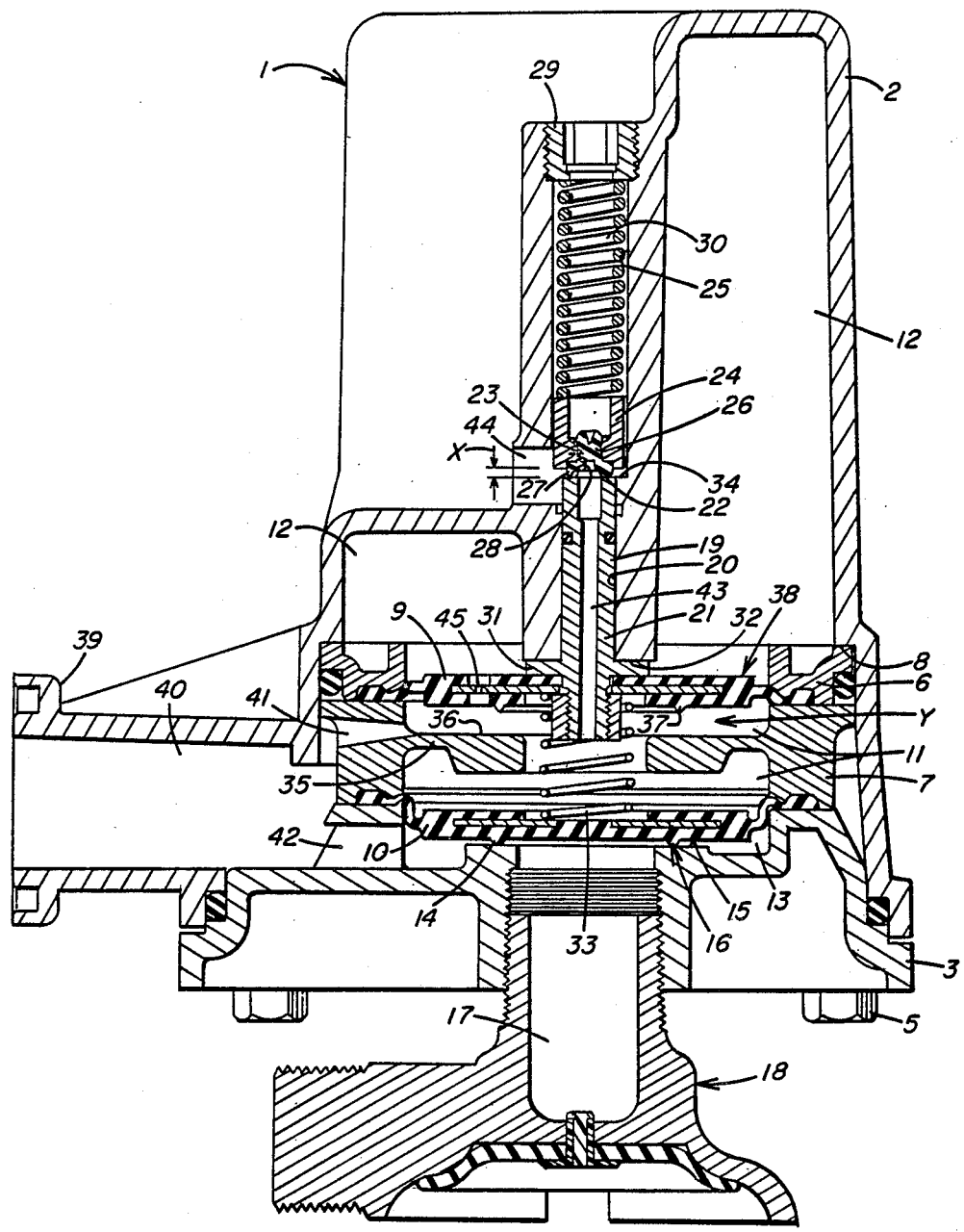

VENT VALVE DEVICE

BACKGROUND OF THE INVENTION more particularly to a vent valve device for effecting a local reduction of fluid pressure in the brake pipe of a railway train at a rate at which an emergency brake application is initiated via the automatic air brake system.

Typically, vent valve devices are employed in modern day freight car brake systems because of the ever increasing length of brake pipe resulting from longer cars, such as "piggy-back" cars, articulated cars, and other inter-modal specialty cars. While freight car control valve devices also include an integral vent valve device, the fact that one or more cars in succession along the train may have their brake systems cut out of operation makes the emergency reduction wave of brake pipe pressure through the entire train difficult to sustain without auxiliary means of venting the brake pipe pressure.

It will be understood, of course, that failure of a brake pipe pressure reduction wave to be propagated through the train at a sufficiently fast rate will preclude attainment of an emergency brake application. It is important, therefore, that a vent valve device be positive in its operation to assure that propagation of an emergency brake pipe pressure reduction wave is sustained through the entire length of the train.

It is also important that, in assuring positive operation in response to an emergency rate of reduction of brake pipe pressure, a vent valve device must have sufficient stability as to not respond to service rates of brake pipe pressure reduction.

Finally, the vent valve device should be insensitive to different train "running" pressures, i.e., the normal pressure at which the train brake pipe is charged. Trains can be operated at pressures of 70 psi to 110 psi.

Vent valve devices, such as shown and disclosed in U.S. Pat. No. 3,165,115, generally operate by sensing a pressure differential across a piston valve assembly that only arises when the rate of reduction of brake pipe pressure on one side of the piston assembly is at an emergency rate.

Two principles of operation are well known for preventing such a pressure differential from arising when a service rate of brake pipe pressure reduction is in effect. In one case, a reference pressure on the other side of the piston assembly is vented directly to atmosphere and in the other case the reference pressure is vented via the evacuated brake pipe. In each case a choke limits the rate of venting of this reference pressure to a service rate, so that only when the brake pipe pressure is reduced at an emergency rate is a predetermined pressure differential developed across the piston assembly. When this occurs, the piston assembly is actuated to operate a valve device that exhausts brake pipe pressure locally. The principle of operation discussed in the first case, i.e., venting the reference pressure directly to atmosphere, requires, for optimum performance, the use of a special valve to throttle the exhaust of the reference pressure during service braking in accord with the actual rate of brake pipe pressure reduction in effect.

When employing the principle of venting the reference pressure via the brake pipe, as noted in the other case mentioned above, the brake pipe pressure influences the rate via which the reference pressure is vented, thus making operation of a vent valve device according to this principle of operation intrinsically sensitive to the different pressures carried in the train brake pipe. While this characteristic is disadvantageous, a vent valve device having this principle of operation does not require a special valve to obtain maximum efficiency and thus can be considerably less costly to build and maintain.

Moreover, U.S. Pat. No. 4,043,604 shows and discloses a vent valve/emergency valve device in which a differential area piston assembly is employed to compensate for different brake pipe pressures, as a means of overcoming the pressure sensitivity of vent valve devices that operate on the principle of venting a reference pressure via the brake pipe.

SUMMARY OF THE INVENTION

The object of the present invention is to provide a new, low-cost, highly reliable vent valve device that is both positive in operation in response to emergency venting of brake pipe pressure, yet stable against undesired operation in response to service venting of brake pipe pressure. Briefly, the vent valve device of the present invention has first and second movable piston abutments arranged to operate independently of each other. A pilot chamber is formed between these piston abutments, with a control chamber being formed on the side of the first piston abutment opposite the pilot chamber and an actuating chamber being formed on the side of the second piston abutment opposite the pilot chamber. The respective chambers are charged from brake pipe pressure, there being a choke via which the control chamber fluid pressure flows, the choke being selected to establish a predetermined pressure differential across the first piston abutment incident to an emergency rate of reduction of the brake pipe pressure.

Only when such a predetermined pressure differential is effective across the first piston abutment does movement of the first abutment occur to operate a pilot valve and, in turn, vent pilot pressure. Immediately, upon opening the pilot valve, the rate of exhaust of brake pipe pressure is accelerated, helping to ensure that such movement of the first piston abutment also effects operation of a cut-off valve, which interrupts fluid pressure communication between the brake pipe and pilot chamber to assure rapid dissipation of pilot chamber pressure owing to its isolated small volume.

This dissipation of pilot chamber pressure rapidly creates a high pressure differential across the second piston abutment to thereby effect its positive actuation and accordingly cause a vent valve to operate to locally vent the brake pipe pressure via the actuating chamber.

BRIEF DESCRIPTION OF THE DRAWINGS

Other objects and attendant advantages of the invention will become apparent from the following, more detailed explanation of a preferred form of the invention when taken with the single FIGURE drawing showing an elevational assembly view in section and the vent valve device in a charged condition.

DESCRIPTION AND OPERATION

Vent valve device 1 comprises preferably a die cast housing including a body portion 2 and a cover portion 3 that closes an opening at one end of body portion 2 via which the majority of the valve components are assembled. Cover portion 3 is held in place by bolts 5 and, in turn, retains a pair of diaphragm clamping plates 6, 7 in place against a shoulder 8 of body portion 2. A control piston 9 in the form of an elastomeric diaphragm member is clamped at its outer periphery between clamping plates 6, 7 and a vent valve piston 10 in the form of a similar elastomeric diaphragm member is clamped at its outer periphery between clamping plate 7 and cover portion 3.

Formed between piston members 9 and 10 is a pilot chamber 11, the bounds of which are delimited by clamping plate 7. On the upper side of diaphragm member 10 opposite pilot chamber 11 is a control chamber 12 delimited by clamping plate 6 and body portion 2. On the under side of diaphragm member 10 opposite pilot chamber 11 is an actuating chamber 13 delimited by cover portion 3 and the outer periphery of an annular sealing bead 14 of diaphragm member 10 that, in conjunction with a seat 15 formed on cover portion 3, constitutes a vent valve 16. A vent port 17 is formed in cover portion 3 at a location within the bounds of annular sealing bead 14 and is fit with a vent protector 18.

Control piston 9 is fixed at its midpoint to a guide stem 19 that is disposed in a bore 20 formed in a projection 21 of body portion 2. One end 22 of stem 19 projects through bore 20 for operating a pilot valve 23 comprising a movable valve cartridge 24 that is disposed in a counterbore 25 of bore 20. Carried by valve cartridge 24 is a valve element 26 having an annular sealing bead 27 that is engageable with a valve seat 28 provided by the projecting end 22 of stem 19. Compressed in counterbore 25 between valve member 24 and a threaded plug 29 that closes counterbore 25 is a spring 30.

An out-turned flange 31 of stem 19 is adapted to engage a stop 32 provided by projection 21 to establish the upwardmost position of diaphragm member 9. A spring 33 is positioned between diaphragm members 9 and 10 in order to bias diaphragm member 9 toward its upwardmost position, while biasing diaphragm member 10 in the opposite direction to a position in which sealing bead 14 of vent valve 16 is engaged with its seat 15.

The length of stem 19 is such that when flange 31 of stem 19 is engaged with stop 32, end 22 of stem 19 holds valve member 24 of pilot valve 23 a predetermined distance X away from a stop 34 formed at the base of counterbore 25. In this position, spring 30 is effective to provide a force sufficient to assure positive engagement of sealing bead 27 with seat 28, while concurrently stop 32 limits the potentially high fluid pressure forces acting on diaphragm member 9 to a value corresponding to the load of spring 30, to thereby prevent undue wear and/or damage to sealing bead 27.

An in-turned flange 35 of clamping plate 7 provides a seat 36 with which an annular sealing bead 37 on the under side of diaphragm member 9 is engageable, seat 36 and sealing bead 37 constituting a cut-off valve 38. When diaphragm member 9 is in its upwardmost position, sealing bead 37 is displaced from seat 36 a distance Y that is greater than the distance X that valve member 24 is displaced from its stop 34.

A pipe flange 39 of body portion 2 is adapted to be connected to a branch pipe of the train brake pipe (neither of which are shown), whereby a port 40 is communicated with pilot chamber 11 via a passage 41 and with actuating chamber 13 via a passage 42.

Extending through guide stem 19 is a central passage 43 that communicates pilot chamber 11 with an exhaust passage 44 via pilot valve 23. A choke 45 is preferably provided in piston member 9, as shown, but may be alternatively located in clamping plate 6 in order to provide a restricted flow communication between control chamber 12 and brake pipe port 40.

It will be understood that prior to charging, i.e., in the absence of any air pressure at port 40 of vent valve device 1, spring 33 establishes closure of Vent valve 16 by reason of its biasing action on vent valve piston 10, while at the same time urging control piston 9 in an upward direction. The opposing force of spring 30, however, being greater than that of spring 33, forces pilot valve member 24 to move distance X into engagement with stop 34. This, in turn, forces flange 31 of stem 19 away from stop 32. Once valve member 24 engages stop 34, spring 30 becomes caged and, in effect, supports the upward-acting force of spring 33 on piston member 9. Consequently, piston member 9 is positioned so that flange 31 is spaced from stop 32 a distance X. Since distance Y is greater than distance X, as previously explained, sealing bead 37 of cut-off valve 38 will be disengaged from its seat 36 to assure that cut-off valve 38 remains open to accommodate subsequent charging of the vent valve device 1, as now explained.

During charging, compressed air from the train brake pipe is registered at vent valve port 40, from where this air is directed via passage 42 to actuating chamber 13, via passage 41 to pilot chamber 11, and via choke 45 to control chamber 12. With cut-off valve 38 open, vent valve 16 and pilot valve 23 closed, as above explained, pressure develops in actuating chamber 13 and pilot chamber 11 in accordance with the pressure carried in the train brake pipe. The resultant differential force on vent valve piston 10 due to its differential effective area reinforces the force exerted by spring 33 thereon to maintain vent valve 16 closed. The air in pilot chamber 11, in turn, charges control chamber 12 at a restricted rate via choke 45 to thereby establish an upward-acting pressure differential across control piston 9 which, in conjunction with the force of spring 33, moves control piston 9 upwardly through distance X until flange 31 engages stop 32. As this movement takes place, stem 19 forces valve member 24 off of its stop 34, further compressing spring 30. With the charging pressure forces on piston member 9 thus supported by stop 32, spring 30 is effective to establish a limited sealing force on sealing bead 28. It will be appreciated, therefore, that the potentially high forces capable of being developed on control piston 9 during charging are isolated from valve element 26 and particularly from sealing bead 27, thus protecting sealing bead 27 from premature wear and/or damage.

When charging is complete, the pressures effective in pilot chamber 11 and control chamber 12 equalize, but control piston 9 continues to be supported by stop 34, since the force of spring 30 is insufficient to overcome the 10 combined force of spring 33 and the pressure force on control piston 9 due to its differential pressure area.

It should be noted at this point that control piston 9 is designed with a specific differential pressure area in accordance with the concept taught in U.S. Pat. No. 4,043,604, as mentioned in the "Background of the Invention".

During a service brake application, brake pipe pressure is reduced at a service rate, in a well-known manner, such reduction being registered at port 40 and consequently in pilot chamber 11. Due to the restriction of choke 45, the reduction of pressure in control chamber 12 lags behind the brake pipe pressure reduction in pilot chamber 11, thereby creating a downward-acting pressure differential across control piston 9. While this pressure differential will vary with the actual service rate of reduction of brake pipe pressure, a maximum pressure differential will develop in response to a full service brake application. The resultant maximum differential pressure force acting downward on control piston 9 combined with the force of spring 30 will only be sufficient to deflect control piston 9 in a downward direction a distance X, since at this point valve member 24 picks up stop 34, thereby caging spring 30. With spring 30 caged and thus ineffective to exert a force on control piston 9, spring 33 is effective to stabilize the control piston against further downward deflection. Accordingly, closure of pilot valve 23 is maintained by continued engagement of sealing bead 27 of valve element 26 with seat 28. The differential area of vent valve piston 10 subject to brake pipe pressure in chambers 11 and 13 is such as to maintain closure of vent valve 16 by reason of sealing bead 14 having engagement with seat 15, so long as closure of pilot valve 26 is maintained, as above explained.

During an emergency brake application, brake pipe pressure is reduced at an emergency rate that is greater than the aforementioned service rate, so as to produce a pressure differential across piston member 9 that is greater than the pressure differential resulting from a service rate of reduction of brake pipe pressure. The downward-acting force on piston member 9 is sufficiently greater than the force created during a service brake application, as to overcome the loss of force resulting from the caging of spring 30 when control piston 9 has been deflected distance X.

ConsequentlY, control piston 9 continues to be deflected in a downward direction beyond distance X, thereby pulling seat 28 formed at the end of guide stem 19 away from sealing bead 27 of valve element 28, to thereby open pilot valve 23. As the pilot valve opens, air is vented directly from chamber 11 at an unrestricted rate to encourage continued downward deflection of control piston 9. As this downward deflection of control piston 9 continues through distance Y, control piston 9 assumes its emergency position in which sealing bead 37 engages seat 36 to close cut-off valve 38 and thereby isolate pilot chamber 11 from port 40 and the train brake pipe. By isolating pilot chamber 11 from the brake pipe, the air in the relatively small volume of pilot chamber 11 is vented quickly to accelerate the reduction of pressure in pilot chamber 11 acting on vent valve piston 10. This establishes a high pressure differential between pilot chamber air effective above vent valve piston 10 and actuating chamber air acting on the underside of vent valve piston 10, to overcome the bias force of spring 33 and deflect vent valve piston 10 in an upward direction.

Immediately upon such upward deflection of vent valve piston 10, vent valve 16 is opened by disengagement of sealing bead 14 from seat 15, thereby exposing the entire area of the underside of vent valve piston 10 to brake pipe pressure to positively establish and maintain vent valve 16 fully open. Accordingly, a local venting of brake pipe pressure is provided from port 40 to atmosphere via passage 42, actuating chamber 13, vent valve 16, vent port 17 and vent protection 18 to supplement the brake pipe pressure reduction initiated via the train brake pipe in order to hasten the emergency application through the train. This prompt and positive opening of vent valve 16 is enhanced by the fact that operation of vent valve 16 is directly responsive to actuation of the diaphragm-type vent valve piston 10, so as to be substantially free of impairment due to the presence of dirt and foreign material that otherwise affects O-ring-type piston arrangements.

Following closure of cut-off valve 38, the pressure effective in control chamber 12 will continue to maintain control piston 9 in its downward-most position in which pilot valve 23 is held open, while the control chamber pressure blows down via choke 45. Since the size of choke 4 is chosen to establish a predetermined pressure differential across control piston 9 during an emergency brake application sufficient to force the control piston to its emergency position, it will be apparent that the control chamber volume is selected in accordance with the chosen size of choke 45, such that the time required to blow down control chamber 12 corresponds to the time required to assure that the train comes to a complete halt. Choke 45 thus serves as a "breather" choke, as well as a "blowdown" choke, thus eliminating the need for two chokes.

Whenever the brake pipe pressure has been exhausted, spring 33 becomes effective to rest vent valve piston 10 and close vent valve 16. However, until the "blowdown" period has expired, the open pilot valve will maintain pilot chamber 11 vented, so that any attempt to recharge brake pipe pressure prematurely will result in control piston 9 being forced in an upward direction to open cut-off valve 38, but not sufficiently far to effect closure of pilot valve 23. Thus, any air supplied to the brake pipe is simply bypassed to atmosphere via port 40, passage 41, the open cut-off valve, pilot chamber 1!, central passage 43 in stem 19, the open pilot valve 23, and exhaust passage 44.

Following expiration of the "blowdown" period required to exhaust control chamber 12 via choke 45, spring 33 will be effective to move piston member 9 in an upward direction sufficiently to not only open cut-off valve 38, but to also close pilot valve 23 by engagement of seat 28 with sealing bead 27 of valve element 26. Vent valve device 1 is thus re-set to accommodate charging of the brake pipe, as previously explained, with flange 31 being spaced from stop 32 a distance X.

I claim:

1. For connection in the brake pipe of a railway train for producing a local venting of the brake pipe fluid under pressure in response to an emergency brake application being initiated in order to propagate an emergency reduction of the brake pipe pressure through the train, a vent valve device comprising:
   (a) a housing in which is formed a pilot chamber, a control chamber, and an actuating chamber, each having fluid pressure communication with said brake pipe;
   (b) pilot valve means operative to an open position for exhausting fluid under pressure from said pilot chamber;
   (c) first piston abutment means operatively disposed between said pilot chamber and said control chamber for operating said pilot valve means to said open position in response to a pressure differential between said control chamber and said pilot chamber incident to an emergency rate of reduction of fluid pressure in said brake pipe;
   (d) cut-off valve means for interrupting said fluid pressure communication between said brake pipe and said pilot chamber in response to said pressure differential effecting said operation of said first piston abutment means;

(e) choke means for establishing said predetermined pressure differential only in response to said reduction of said brake pipe fluid pressure being at an emergency rate;

(f) a vent port;

(g) vent valve means between said actuating chamber and said vent port for interrupting fluid pressure communication between said brake pipe and said vent port only until such time as said vent valve means is actuated; and (h) second piston abutment means between said pilot chamber and said actuating chamber for effecting said actuation of said vent valve means in response to said release of fluid pressure from said pilot chamber.

2. A vent valve device as recited in claim 1, wherein said pilot valve means is operative to said open position to initiate said release of said pilot chamber fluid under pressure prior to said cut-off valve means interrupting fluid pressure communication between said brake pipe and said pilot chamber.

3. A vent valve device as recited in claim 2, wherein said choke means provides fluid pressure communication between said control chamber and said brake pipe following said interruption of fluid pressure communication between said brake pipe and said pilot chamber by said cut-off valve 4. A vent valve device as recited in claim 1, wherein said pilot valve means comprises:

(a) a valve seat carried by said first piston abutment means;

(b) a movable valve member including an elastomeric element having an annular sealing bead projecting from said movable member; and (c) first spring means for biasing said movable valve member in a direction to effect engagement of said sealing bead with said seat and thereby interrupt said release of fluid under pressure from said pilot chamber.

5. A vent valve device as recited in claim 4, further comprising:

(a) a first stop on said housing against which said first piston abutment means rests during charging of said pilot chamber with fluid under pressure in said brake pipe;

(b) a second stop on said housing on which said movable valve member is supported under the influence of said first spring means following movement of said first piston abutment means a predetermined distance away from said first stop.

6. A vent valve device as recited in claim 5, wherein said first abutment means is an elastomeric diaphragm 7. A vent valve device as recited in claim 6, wherein said cut-off valve means comprises:

(a) an annular sealing bead projecting from one surface of said elastomeric diaphragm member subject to fluid pressure of said pilot chamber; and (b) a valve seat on said housing with which said sealing bead is engageable, said sealing bead being spaced-apart from said valve seat a distance greater than said predetermined distance when said first piston abutment means is resting against said first stop.

8. A vent valve device as recited in claim 7, wherein the effective pressure area of said one surface of said diaphragm member is greater than the effective pressure area of the opposite surface thereof.

9. A vent valve device as recited in claim 6, wherein said choke means is carried by said diaphragm member at a location outside the circumference of said annular sealing 10. A vent valve device as recited in claim 6, further comprising:

(a) a bore in said housing; and (b) said first piston abutment means further comprising:

(i) a guide stem having one end fixed to said diaphragm member and the other end extending through said bore into engagement with said annular bead of said elastomeric element; and (ii) a central passageway extending through said guide stem and opening at said other end of said guide stem within the bounds of said annular sealing bead of said elastomeric element.

11. A vent valve device as recited in claim 1, wherein said second piston abutment means is an elastomeric diaphragm member.

12. A vent valve device as recited in claim 11, wherein said vent valve means comprises:

(a) a valve seat formed on said housing; and (b) an annular sealing bead projecting from one surface of said elastomeric diaphragm member subject to said actuating chamber fluid pressure, said sealing bead being engageable with said valve seat in surrounding relationship with said vent port.

13. A vent valve device as recited in claim 12, wherein the effective pressure area of said one surface of said elastomeric diaphragm member surrounding said annular sealing bead is subject to fluid pressure of said actuating chamber, said area being less than the area of the opposing surface of said elastomeric diaphragm member.

14. A vent valve device as recited in claim 13, further comprising spring means for biasing said elastomeric diaphragm in a direction to effect engagement of said sealing bead with said valve seat.

* * * * *